(12) United States Patent
Dehmann et al.

(10) Patent No.: US 8,677,271 B2
(45) Date of Patent: Mar. 18, 2014

(54) METHOD FOR DISPLAYING INFORMATION IN A MOTOR VEHICLE AND DISPLAY DEVICE FOR A MOTOR VEHICLE

(75) Inventors: Rainer Dehmann, Berlin (DE); Mathias Kuhn, Berlin (DE)

(73) Assignee: Volkswagen AG, Wolfsburg (DE)

( * ) Notice: Subject to any disclaimer, the term of this patent is extended or adjusted under 35 U.S.C. 154(b) by 604 days.

(21) Appl. No.: 12/674,398

(22) PCT Filed: Aug. 7, 2008

(86) PCT No.: PCT/EP2008/060397
§ 371 (c)(1),
(2), (4) Date: Mar. 24, 2011

(87) PCT Pub. No.: WO2009/024474
PCT Pub. Date: Feb. 26, 2009

(65) Prior Publication Data
US 2011/0179363 A1    Jul. 21, 2011

(30) Foreign Application Priority Data
Aug. 21, 2007 (DE) .......................... 10 2007 039 444

(51) Int. Cl.
*G06F 3/14* (2006.01)
*G06F 13/00* (2006.01)

(52) U.S. Cl.
USPC ........................................... 715/804; 715/863

(58) Field of Classification Search
USPC ......... 715/835, 768, 810, 815, 828, 839, 788, 715/764–765, 834, 841, 798
See application file for complete search history.

(56) References Cited

U.S. PATENT DOCUMENTS

| | | | |
|---|---|---|---|
| 4,672,370 A | 6/1987 | Yu | |
| 4,686,522 A | 8/1987 | Hernandez et al. | |
| 5,502,803 A | 3/1996 | Yoshida et al. | |

(Continued)

FOREIGN PATENT DOCUMENTS

| | | |
|---|---|---|
| DE | 44 46 431 | 6/1996 |
| DE | 198 37 510 | 2/2000 |

(Continued)

OTHER PUBLICATIONS

Almy, et al., "User interface for zooming of graphic displays," Research Disclosure, Mason Publications, Hampshire, GB, vol. 312, No. 46, Apr. 1, 1990.

(Continued)

*Primary Examiner* — Cao "Kevin" Nguyen
(74) *Attorney, Agent, or Firm* — Kenyon & Kenyon LLP

(57) ABSTRACT

In a method for displaying information in a motor vehicle, at least one two-dimensional object is represented graphically with the aid of a display mounted in the motor vehicle, the graphical object including a display field and an operating field. A user-interface device generates graphics data which control the display such that the display field is shown on one side of the two-dimensional graphical object and the operating field is shown on the other side of the two-dimensional graphical object, and in response to an input with the aid of an input device, an arithmetic logic unit of the user-interface device alters the graphics data such that the object in the perspective representation on the display rotates from one side to the other side. A corresponding display device is provided for a motor vehicle, and a motor vehicle may include such a display device.

28 Claims, 3 Drawing Sheets

(56) References Cited

U.S. PATENT DOCUMENTS

| | | | |
|---|---|---|---|
| 5,689,284 | A | 11/1997 | Herget |
| 5,751,275 | A | 5/1998 | Bullister |
| 5,844,547 | A | 12/1998 | Minakuchi et al. |
| 5,880,743 | A | 3/1999 | Moran et al. |
| 6,052,110 | A | 4/2000 | Sciammarella et al. |
| 6,388,684 | B1 | 5/2002 | Iwamura et al. |
| 6,430,501 | B1 | 8/2002 | Slominski |
| 6,448,987 | B1 | 9/2002 | Easty et al. |
| 6,452,570 | B1 | 9/2002 | Kuenzner |
| 6,538,635 | B1 | 3/2003 | Ringot |
| 6,642,936 | B1 | 11/2003 | Engholm et al. |
| 6,769,320 | B1 * | 8/2004 | Bollgohn et al. ............. 73/866.3 |
| 6,898,523 | B2 | 5/2005 | Cochlovius et al. |
| 6,956,540 | B1 | 10/2005 | Yoshihara et al. |
| 6,958,749 | B1 | 10/2005 | Matsushita et al. |
| 7,111,788 | B2 | 9/2006 | Reponen |
| 7,327,349 | B2 | 2/2008 | Robbins et al. |
| 7,439,969 | B2 | 10/2008 | Chithambaram et al. |
| 7,620,496 | B2 | 11/2009 | Rasmussen |
| 7,730,425 | B2 | 6/2010 | de los Reyes |
| 7,773,075 | B2 | 8/2010 | Otsuka et al. |
| 7,814,419 | B2 | 10/2010 | Fabritius |
| 7,865,301 | B2 | 1/2011 | Rasmussen et al. |
| 7,966,577 | B2 * | 6/2011 | Chaudhri et al. ............. 715/835 |
| 8,028,250 | B2 | 9/2011 | Vronay et al. |
| 8,151,210 | B2 | 4/2012 | Nezu et al. |
| 8,327,291 | B2 | 12/2012 | Oguchi |
| 2002/0041260 | A1 | 4/2002 | Grassmann |
| 2003/0164818 | A1 | 9/2003 | Miller-Smith |
| 2005/0267676 | A1 | 12/2005 | Nezu et al. |
| 2006/0206264 | A1 | 9/2006 | Rasmussen |
| 2007/0143676 | A1 | 6/2007 | Chen |
| 2007/0157126 | A1 | 7/2007 | Tschirhart et al. |
| 2008/0036771 | A1 | 2/2008 | Bae |
| 2008/0161997 | A1 | 7/2008 | Wengelnik et al. |

FOREIGN PATENT DOCUMENTS

| | | |
|---|---|---|
| DE | 100 01 988 | 7/2001 |
| DE | 199 41 955 | 8/2001 |
| DE | 100 39 432 | 12/2001 |
| DE | 100 58 244 | 5/2002 |
| DE | 101 17 030 | 10/2002 |
| DE | 101 18 765 | 5/2003 |
| DE | 101 55 549 | 5/2003 |
| DE | 103 03 792 | 8/2004 |
| DE | 103 05 341 | 8/2004 |
| DE | 600 18 874 | 7/2005 |
| DE | 601 06 175 | 11/2005 |
| DE | 10 2004 029 203 | 12/2005 |
| DE | 10 2004 048 956 | 4/2006 |
| DE | 10 2005 035 111 | 9/2006 |
| DE | 10 2005 017 313 | 10/2006 |
| DE | 10 2006 002 679 | 8/2007 |
| EP | 0 547 993 | 6/1993 |
| EP | 1 052 566 | 11/2000 |
| EP | 1 207 072 | 5/2002 |
| EP | 1 212 208 | 6/2002 |
| EP | 1 560 102 | 8/2005 |
| GB | 2 434 068 | 7/2007 |
| JP | 2006-260265 | 9/2006 |
| WO | WO 00/04440 | 1/2000 |
| WO | WO 02/39712 | 5/2002 |
| WO | WO 2005/091122 | 9/2005 |
| WO | WO 2006/108617 | 10/2006 |

OTHER PUBLICATIONS

International Preliminary Report on Patentability, PCT application No. PCT/EP2008/058842.

International Preliminary Report on Patentability, PCT application No. PCT/EP2008/060343.

International Preliminary Report on Patentability, PCT application No. PCT/EP2008/060397.

International Search Report and Written Opinion, PCT Application No. PCT/EP2008/058842.

International Search Report and Written Opinion, PCT Application No. PCT/EP2008/060343.

International Search Report and Written Opinion, PCT Application No. PCT/EP2008/060397.

Search Report, German Patent Application No. 10 2007 039 442.1.

Search Report, German Patent Application No. 10 2007 039 446.4.

Search Report, German Patent Application No. 10 2007 039 444.8.

* cited by examiner

METHOD FOR DISPLAYING INFORMATION IN A MOTOR VEHICLE AND DISPLAY DEVICE FOR A MOTOR VEHICLE

FIELD OF THE INVENTION

The present invention relates to a method for displaying information in a motor vehicle, in which at least one two-dimensional object is represented graphically with the aid of a display mounted in the motor vehicle, the graphical object including a display field and an operating field. The present invention further relates to a display device for a motor vehicle having a display for the graphical representation of information, a user-interface device by which at least one graphical object displayable on the display is able to be generated, the graphical object including a display field and an operating field, and an input device coupled to the user-interface device.

BACKGROUND INFORMATION

In a motor vehicle, there are various information and communication areas to which indicating instruments are assigned. They are used to provide information to the driver and passengers. Moreover, they are able to assist the driver in navigation or communication with the outside world. In particular, the display is able to visually represent vehicle data related to traffic or operation. What is termed the instrument cluster is disposed in the vicinity of the primary field of view of the driver. Usually it is located in the cockpit behind the steering wheel and is visible through an opening in the steering wheel. It is used especially to display the speed, the fuel-tank capacity, the radiator temperature and other motor-vehicle information specific to operation. In addition, radio and audio functions may be displayed. Finally, menus for telephone, navigation, telematic services and multimedia applications may be displayed. Usually liquid-crystal displays in various forms are used as display.

For example, German Published Patent Application No. 100 01 988 describes an instrument cluster for the display of operation-related and/or traffic-related data. To permit better comprehension of the diverse offering of information, German Published Patent Application No. 103 03 792 describes a perspective representation of three-dimensional elements.

As a further display device, a vehicle frequently possesses a multifunction display in the center console or above the center console. Such a multifunction operating element is described, for example, in German Published Patent Application No. 199 41 955.

In order to present the various operating and display possibilities in clearly arranged fashion, hierarchical menu structures are frequently used. A menu shows various menu items and, if applicable, graphics or icons assigned to the menu items. Upon selection of a menu item, a submenu having further submenu items opens. This structure may be continued over several hierarchical levels. In addition, instead of being assigned a submenu, a menu item may be assigned a specific display image which represents the information assigned to the menu item.

If such menu structures are used in a motor vehicle, the problem arises that navigation within these menu structures and the absorption of the information indicated by the display claim the attention of the driver in such a way that he is no longer able to safely drive the motor vehicle at the same time. Thus, if the driver wants to operate vehicle devices whose information is shown via the display device, he should do so prior to starting a trip or should interrupt his driving in order to operate them. However, such drawbacks for the user operation are undesirable. In many cases, the result is that the driver operates the devices in the vehicle while driving, although this leads to a distraction which can represent a safety risk.

It is therefore desirable that the information in the motor vehicle be displayed in such a way that it may be comprehended quickly and intuitively by the driver, so that the acquisition of the displayed information does not cause the driver to be distracted while driving. Furthermore, the operation should be executable so intuitively, easily and quickly that the driver is able to operate the devices of the vehicle, whose information is displayed by the display device, while driving, as well, even if possibly complex hierarchical structures are displayable by the display device. The display of information and the operator control associated with a display of information in the motor vehicle thus contribute to safety when driving the motor vehicle.

SUMMARY

Example embodiments of the present invention provide a method and a display device of the type indicated at the outset, in which the displayed information is able to be comprehended as quickly and intuitively as possible, and which permit a rapid, intuitive and simple operator control of vehicle devices whose information is displayed.

The method of example embodiments of the present invention is characterized in that a user-interface device generates graphics data which control the display such that the display field is shown on one side of the two-dimensional graphical object and the operating field is shown on the other side of the two-dimensional graphical object, and that in response to an input with the aid of an input device, an arithmetic logic unit of the user-interface device alters the graphics data such that the graphical object in the perspective representation on the display rotates from one side to the other side. In particular, the two-dimensional object has a front side and a back side, on which the operating field and the display field, respectively, are shown.

In a motor vehicle, varied information should be displayed to the vehicle occupants, and especially the driver. This information includes information relating particularly to the operation of the vehicle. This information also includes readouts which are assigned to the various devices accommodated in the vehicle. However, the information display should likewise assist in the operator control of the devices in the vehicle. To that end, the readout on the display interacts with an input device. The display visually displays the operating steps carried out via the input device, and also indicates the possible operating steps. When displaying information in a motor vehicle, it is therefore necessary to differentiate between the display contents which are used for the actual representation of information, and the display contents which relate to the operator control of devices in the motor vehicle.

Usually, the information display in a motor vehicle has both display contents together in various areas of the display. According to example embodiments of the present invention, the display contents which include the pure rendering of information that is not connected to operating steps are shown in a display field of a graphical object, and separately from that, the display contents which include the visual display of operating steps are shown in an operating field. This separation of the information contents makes it easier for the viewer to quickly and intuitively take in the displayed information, so that safety in driving the vehicle is thereby increased since the driver is distracted to a lesser extent from the driving of the vehicle by the absorption of the displayed information.

According to example embodiments of the present invention, the separation of the display field and the operating field of the graphical object is further visualized for the viewer in that the two fields are represented on different sides of a two-dimensional graphical object, and with the aid of an input, the viewer is able to rotate the perspective representation of the graphical object on the display from one side to the other side, and thus is able to get from the display field to the operating field and vice versa.

According to example embodiments of the present invention, the arithmetic logic unit of the user-interface device generates graphics data for successive intermediate images to represent the rotation, the rotation being subdivided into a first phase during which pixels of the graphical object are moved in accelerated fashion, and a second phase during which pixels of the graphical object are moved in decelerated fashion. In this context, for example, the first phase corresponds to an angle of rotation of the graphical object from 0° to 90°, and the second phase corresponds to an angle of rotation of the graphical object from 90° to 180°. In particular, the axis of rotation lies within the graphical object. Preferably, the axis is aligned in the direction of the height of the display. Furthermore, the axis is preferably located centrally in the graphical object.

An accelerated movement should be understood to be a positive acceleration during which the speed increases, and a decelerated movement should be understood to be a negative acceleration during which the speed reduces.

In the method according to example embodiments of the present invention, the manner in which the objects are rotated is of special importance. Namely, how well and how quickly the viewer is able to orient himself within the objects, even if they have been rotated, depends on the representation of this rotation. In this context, many animation techniques which are used outside of the motor vehicle for the variable graphical display of objects are unsuitable for use in the motor vehicle, since in the motor vehicle, the viewer only looks at the display for brief moments. Therefore, the time characteristic of the change in a position of a graphically represented object is also especially important with respect to safety in driving the vehicle.

According to example embodiments of the present invention, the following computational steps are carried out in calculating the graphics data for successive intermediate images to represent the rotation—the successive positions x of the pixels of the graphical object—in the first phase:

$$n = \frac{t - t_0}{d_1}; \quad \text{(i)}$$

$$x = b_1 + c_1 \cdot n^4, \quad \text{(ii)}$$

where
t is a system time at which the generated graphics data are shown on the display, with
$t = t_0$ at the beginning of the rotation of the first phase,
$d_1$ is the duration of the first phase,
$b_1$ is the starting position of the pixel of the graphical object,
$c_1$ is the total shift of the pixel of the graphical object in the first phase and
steps (i) and (ii) are repeated until: $t > (t_0 + d_1)$.

In addition, the following computational steps are carried out in calculating the graphics data for successive intermediate images to represent the rotation—the successive positions x of the pixels of the object—in the second phase:

$$n = \frac{t - t_0}{d_1} - 1; \quad \text{(i)}$$

$$x = b_2 + c_2 \cdot (1 - n^4), \quad \text{(ii)}$$

where
t is a system time at which the generated graphics data are shown on the display, with
$t = t_0$ at the beginning of the rotation of the second phase,
$d_2$ is the duration of the second phase,
$b_2$ is the starting position of the pixel of the object,
$c_2$ is the total shift of the pixel of the object in the second phase and
steps (i) and (ii) are repeated by the arithmetic logic unit until: $t > (t_0 + d_2)$.

Furthermore, the duration of the total rotation is of special importance for the comprehensibility of the displayed information. In the method, the duration of the total rotation is in a range from 0.5 seconds to 2 seconds, preferably in a range from 1 second to 1.5 seconds. In particular, the duration of the rotation of the first phase is in a range from 0.25 second to 1 second, and preferably in a range from 0.5 second to 0.75 second. Furthermore, the duration of the rotation of the second phase is in a range from 0.25 second to 1 second, preferably in a range from 0.5 second to 0.75 second. It is further preferred that the duration of the rotation of the first phase corresponds to the duration of the rotation of the second phase.

According to example embodiments of the present invention, the speed of the motor vehicle is measured, and the duration of the total rotation or the duration of the rotation of the first and/or second phase is ascertained as a function of the speed of the motor vehicle. By preference, the higher the speed of the motor vehicle, the longer the duration of the rotation. Namely, at higher speeds, the driver can only direct his eye toward the display for shorter time intervals. Moreover, the spacing of the time intervals in which the driver directs his eye toward the display is greater, since at higher speeds, the driver must focus greater attention on the driving process. The coupling of the rotational duration of the two-dimensional object to the speed of the motor vehicle therefore ensures that at higher speeds, the driver retains his orientation in the information display, and in this manner, is able to comprehend the information contents easily, quickly and intuitively.

The operating field, which is represented on one side of the two-dimensional object, in particular includes command buttons via which inputs may be implemented with the aid of the input device.

According to example embodiments of the present invention, the input is accomplished by touching the display. According to another development, the input is accomplished by a gesture of a body part of a user, which is performed in front of the display. The gesture is detected and evaluated by the input device or another downstream device. For example, the gesture of the body part of the user may be detected by a capacitive coupling between the body part and a receiving device. Moreover, the gesture of the body part of the user may be detected by an emission of infrared radiation and reflection of this infrared radiation by the body part of the user.

The display device according to example embodiments of the present invention is characterized in that the user-interface device is able to generate graphics data which control the display such that the display field is shown on one side of the two-dimensional graphical object, and the operating field is shown on the other side of the two-dimensional graphical object, and that the user-interface device includes an arithmetic logic unit by which, as a function of an input with the aid of the input device, the graphics data are able to be altered such that the two-dimensional graphical object of the perspective representation on the display rotates from one side to the other side.

In particular, graphics data for successive intermediate images to represent the rotation are able to be generated by the arithmetic logic unit of the user-interface device, the rotation being subdivided into a first phase during which pixels of the graphical object are moved in accelerated fashion, and a second phase during which pixels of the graphical object are moved in decelerated fashion.

In calculating the graphics data for successive intermediate images in the first and second phase, respectively, in particular, the above-indicated computing steps for the first and second phase are executable by the arithmetic logic unit. The duration for the rotation for the first and second phase, respectively, is especially within the ranges indicated above, as well.

According to example embodiments of the present invention, the display device includes an interface for the reception of data concerning the speed of the motor vehicle. In this case, the duration of the total rotation or the duration of the rotation of the first and/or second phase is ascertainable by the arithmetic logic unit as a function of these speed data.

The input device may be a touch-sensitive surface of a display. Preferably, the input device is a device for sensing and evaluating a gesture of a body part of a user which is performed in front of the display. To this end, in particular, the input device may include a receiving device to which a signal is transmittable capacitively from the body part of the user when the body part is near the receiving device. The position of the body part may be detected with the aid of this capacitive coupling. A gesture by the user may be inferred from the change in this position over time.

Furthermore, according to another development, the input device may include an infrared-light source or a receiver for reflected infrared light for detecting the gesture of the body part of the user. The position of the body part and its change over time is sensed and interpreted as gesture in this case, as well.

The user-interface device is preferably coupled to a driver-assistance system. In this case, the graphics data are able to be generated by the user-interface device such that information from the driver-assistance system is displayable in the display field of the graphical object.

Finally, example embodiments of the present invention provide a motor vehicle having the display device described above.

Further features and aspects of example embodiments of the present invention are described in more detail below with reference to the appended Figures.

DETAILED DESCRIPTION

Figure 1:
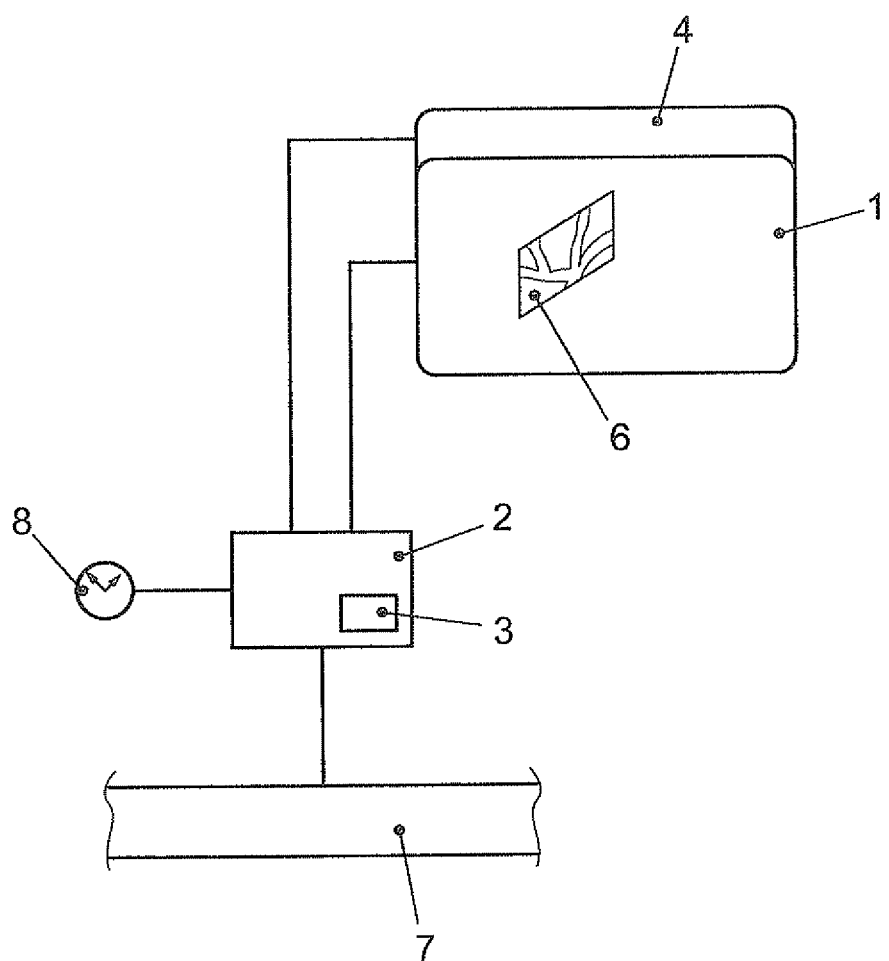
FIG. 1 shows schematically a display device according to an example embodiment of the present invention and the connection of this display device to other devices of the motor vehicle.

The display device includes a display 1 for the graphical representation of information. Display 1 may be a matrix display, e.g., an LCD (liquid crystal display), especially a color display using TFT (thin-film transistor) technology. Furthermore, the display may be what is referred to as a twisted nematic-liquid crystal display (TN-LCD), a super twisted nematic (STN) display, a double-layer STN, an FLC (ferroelectric liquid crystal) display or an SSFLC (surface stabilized ferroelectric liquid crystal). Assigned to display 7 is a back-lighting (not shown) which may be provided by one or more light-emitting diodes. Display 1 is freely programmable, that is, any desired graphics data may be generated, which are represented on display 1.

In particular, display 1 is mounted in an area of the vehicle that is clearly visible for at least the driver. If the operator control of the devices of the vehicle is directly coupled to the placement of the display, so that, for example, the user must bring his hand or his finger at least into the vicinity of display 1 in order to make inputs, then display 1 is positioned such that the driver of the vehicle may easily reach it with his hand or his finger. For instance, display 1 may be accommodated in the center console of the vehicle.

Display 1 is connected to a user-interface device 2, by which graphics data are able to be generated for graphical objects displayable on display 1. User-interface device 2 is also connected to an input device 4, via which the user is able to control devices of the vehicle whose information is displayed on display 1.

For example, input device 4 may be a device for detecting and evaluating a gesture of a body part of a user. For instance, the hand of the user may perform the gesture in front of display 1. In so doing, the three-dimensional position of the hand is detected in a specific location area in front of display 1 without it being necessary to touch display 1. The permitted location area is a function of the placement of display 1 in the motor vehicle. The area should be selected such that the stay of the hand of a user in this location area may be associated unequivocally with an operative control of input device 4. For instance, the boundary of the location area may lie 40 cm to 10 cm in front of display 1. If the hand of the user is brought up closer than this threshold value to display 1, this is detected by input device 4, and the approach is interpreted as an operating intention. For instance, this may lead to the objects displayed by display 1 being shown differently. Furthermore, this may be interpreted as an input which leads to a rotation of the graphical object, as described later in detail. Input device 4 detects the position and the movement of the hand of the user in the location area. In so doing, various gestures performed by the hand are recognized and interpreted as inputs.

For example, input device 4 may include infrared-light sources and infrared-light receivers, which detect the infrared light reflected by the hand. Details of such an input device are described in German Published Patent Application No. 100 58 244, which is hereby incorporated in its entirety by reference thereto. Further input devices which may be used in conjunction with the display device are described in the following publications: German Published Patent Application No. 103 05 341 and German Published Patent Application No. 10 2004 048 956.

Furthermore, the position of the hand and its change over time may also be detected by an optical system. In this system, for example, a light-emitting diode emits square-wave, amplitude-modulated light. This light is reflected by the object to be detected, i.e., the hand, and after the reflection, arrives at a photodiode. A further light-emitting diode likewise emits square-wave, amplitude-modulated light to the photodiode, this light, however, being phase-shifted by 180°. At the photodiode, the two light signals superimpose and cancel each other out if they have exactly the same amplitude. If the signals do not cancel each other out at the photodiode, the light emission of the second diode is regulated via a control loop such that the total received signal again adds up to zero. If the position of the object changes, the light component which arrives at the photodiode from the first light-emitting diode via the reflection at the object also changes. This brings about a correction of the intensity of the second light-emitting diode through the control loop. The control signal is therefore a measure for the reflection of the light, which is emitted by the first diode, at the object. In this manner, a signal which is characteristic for the position of the object may be derived from the control signal.

In addition, the input device may be a touch-sensitive foil, which is provided on display 1. The position at which display 1 disposed behind the foil is touched may be detected by the foil. For example, the foil may take the form of a resistive touch foil, capacitive touch foil or piezoelectric foil. In addition, the foil may be constructed such that a flow of heat which goes out from the finger of a user, for instance, is measured. Various inputs may be obtained from the evolution of the touching of the foil over time. For example, in the simplest case, the touching of the foil at a specific position may be assigned to one graphical object displayed on display 1. Sliding movements of the finger over the foil may be interpreted, as well. In this manner, the user is able in particular to define a line on display 1 by touching the foil at one point, sliding on the foil toward another point, and taking the finger off the foil at this other point.

Finally, a remote operator control element may be used as input device. In particular, the remote operator control element is a mechanical control element. For instance, a rotary switch may be provided by which objects shown on the display are controllable and are selectable by pressing the rotary switch. Furthermore, an angle of rotation may also be input directly by the rotary switch, as explained later. In addition, separate pressure switches may be disposed around the rotary switch, the arrangement of display fields on the display, which are assigned to the pressure switches, corresponding at least schematically to the arrangement of the pressure switches. The information system may include a multifunction operating device, for example, as described in European Published Patent Application No. 1 212 208.

User-interface device 2 is further coupled to a system clock 8 and to a vehicle bus 7. User-interface device 2 is connected to driver-assistance systems of the vehicle via vehicle bus 7. User-interface device 2 receives data from these driver-assistance systems via vehicle bus 7, and prepares these data so that they are displayed graphically to the driver or the vehicle occupants via display 1. To this end, user-interface device 2 generates graphics data for objects displayable on display 1, which, inter alia, graphically represent the information of the driver-assistance systems. User-interface device 2 is further connected via vehicle bus 7 to various information devices and communication devices, as well as entertainment devices of the vehicle. The varied information from these vehicle devices is processed in user-interface device 2 and converted into graphics data for a graphical representation. For animations of the graphical representation on the display, the user-interface device includes an arithmetic logic unit 3 which refers to system clock 8 in the generating of intermediate images.

Figure 2:
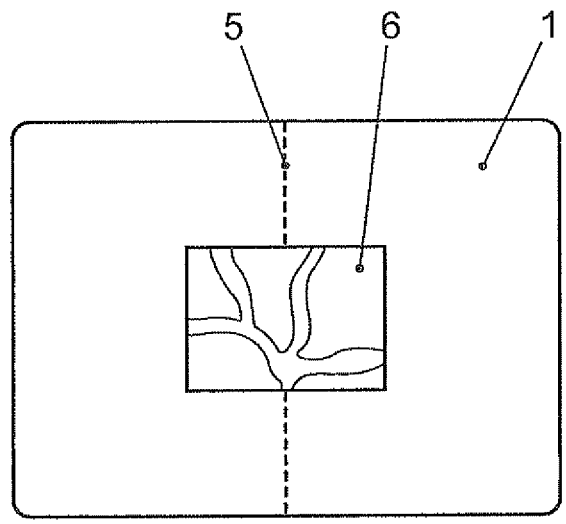
FIG. 2 shows a readout of the display, generated by a method according to an example embodiment of the present invention, for the display field of the graphical object.
Figure 3:
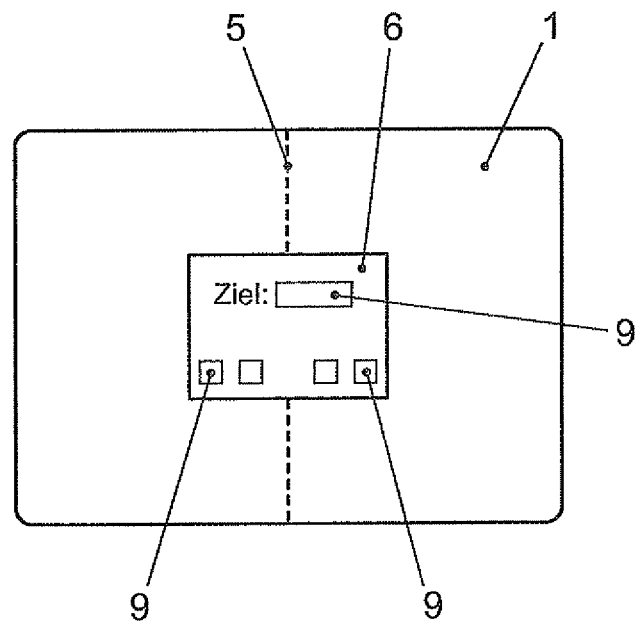
FIG. 3 shows a readout of the display, generated by a method according to an example embodiment of the present invention, for the operating field of the graphical object.

In the following, the information readout on display 1 in the vehicle is explained in detail:

Object 6 displayed by display 1 is the graphical representation of a rectangular surface which includes a display field on the front side and an operating field on the back side. FIG. 2 shows a view of display 1 in which the display field of graphical object 6 is visible, and FIG. 3 shows a view of display 1 in which the operating field of graphical object 6 is visible. The object of this exemplary embodiment relates to the navigation system of the vehicle. In this case, for example, a geographical map is shown in the display field. In particular, no command buttons which are connected to operating steps are shown in the display field. In the operating field, on the other hand, various command buttons 9 are shown by which the navigation system is able to be operated via input device 4. In particular, a destination for the navigation system may be input via the operating field.

In order to get from the view shown in FIG. 2 to the view shown in FIG. 3, in response to an input with the aid of input device 4, the graphical object may be rotated from one side to the other side about axis 5. Axis 5 is aligned vertically, that is, in the direction of the height of display 1. Preferably, it centrally intersects graphical object 6. The rotation of graphical object 6 is represented perspectively, so that during this animation, the pixels of graphical object 6 are shifted horizontally, i.e., in the direction of the width of display 1. An angle of rotation of perspectively represented, graphical object 6 therefore corresponds to the shift of a pixel of the graphical object. The following descriptions relate to the positions of the pixels of graphical object 6 in the horizontal direction. These positions may easily be converted into angles of rotation, as well.

In the method described above for rotating graphical object 6, the transition between two static representations on display 1, in which the front side and back side, respectively, of object 6 are shown, is especially important. Namely, since the display device is accommodated in a motor vehicle, it is especially important that, in particular, the driver of the motor vehicle is able to quickly, easily and intuitively comprehend the information shown on display 1, even if he only directs his eye to display 1 for brief periods. In this context, it is especially important that at any time, the viewer is able to differentiate clearly between a display field and an operating field. Abrupt changes of display images are disadvantageous for this. In particular, fluid transitions between two static representations, during which intermediate images are displayed that clarify the transition between the two static representations, facilitate the orientation in the structure as well as the comprehensibility of the information content.

Moreover, it is especially important how the intermediate images visually display the transition between two static representations. In this instance, a linear transition from one static representation to the next static representation is not suitable for the practical application in a motor vehicle. Rather, intermediate images are advantageous which illustrate a movement of objects 6 that is accelerated and decelerated. The parameters for the selection of the acceleration and the duration of the transition must also be adapted to the application in the vehicle, so that for the most part, conventional animations familiar from the computer field are not usable.

In the following, it is described in detail how graphical object 6 is rotated:

The rotation of graphical object 6 is subdivided into two phases. During the first phase, object 6 is rotated from a starting position, shown in FIG. 2, by 90° into a neutral position in which only the lateral face of the graphical object is visible. In a second phase, the graphical object is rotated further up to an angle of rotation of 180°, until the other side of graphical object 6 shown in FIG. 3 is visible. During the rotation, the side of graphical object 6 visible in each case continues to be represented perspectively on the respective surface. The perspective representation of the rotation may take place either so that the viewer looks directly at graphical object 6, that is, the viewing line extends parallel to the virtual normal of graphical object 6. The perspective representation may also be implemented such that the viewer observes graphical object 6 virtually at an angle from above. In the following, it is assumed that the viewer is looking in a direction transverse to the surfaces of graphical object 6 shown by FIGS. 2 and 3, so that the perspective representation of graphical object 6 in the first phase leads to a surface of graphical object 6 becoming smaller, and in the second phase to a surface of graphical object 6 becoming larger. For example, if one assumes that the width of graphical object 6 takes up 800 pixels of display 1, and 0 denotes the pixels at the left edge of graphical object 6, then during the movement, the pixels of the left edge of graphical object 6 initially travel up to pixel 400 in the center of graphical object 6 in the first phase, and from there, up to pixel 800 at the right edge of graphical object 6. Thus, pixel 0 corresponds to an angle of rotation of 0°, pixel 400 corresponds to an angle of rotation of 90° and pixel 800 corresponds to an angle of rotation of 180°.

The rotation of graphical object 6 is represented by successive intermediate images that indicate successive positions of the pixels of graphical object 6. In the first phase, the following computational steps are carried out in calculating the graphics data for these positions x:

$$n = \frac{t - t_0}{d_1}; \quad \text{(i)}$$

$$x = b_1 + c_1 \cdot n^4, \quad \text{(ii)}$$

where
t is a system time at which the generated graphics data are shown on display 1, with
$t = t_0$ at the beginning of the rotation of the first phase,
$d_1$ is the duration of the first phase,
$b_1$ is the starting position of the pixel of graphical object 6,
$c_1$ is the total shift of the pixel of graphical object 6 in the first phase and
steps (i) and (ii) are repeated until: $t > (t_0 + d_1)$.

For the second phase, the following computational steps are carried out:

$$n = \frac{t - t_0}{d_1} - 1; \quad \text{(i)}$$

$$x = b_2 + c_2 \cdot (1 - n^4), \quad \text{(ii)}$$

where
t is a system time at which the generated graphics data are shown on display 1, with
$t = t_0$ at the beginning of the rotation of the second phase,
$d_2$ is the duration of the second phase,
$b_2$ is the starting position of the pixel of graphical object 6,
$c_2$ is the total shift of the pixel of graphical object 6 in the second phase and
steps (i) and (ii) are repeated until: $t > (t_0 + d_2)$.

The computational steps are executed by arithmetic logic unit 3 of user-interface device 2, system time t being transmitted from system clock 8 to arithmetic logic unit 3.

Duration $d_1$ of the rotation of the first phase is in a range from 0.25 second to 1 second, particularly in a range from 0.5 second to 0.75 second. Likewise, the duration of the rotation of the second phase is in a range from 0.25 second to 1 second, particularly in a range from 0.5 second to 0.75 second.

Figure 4:
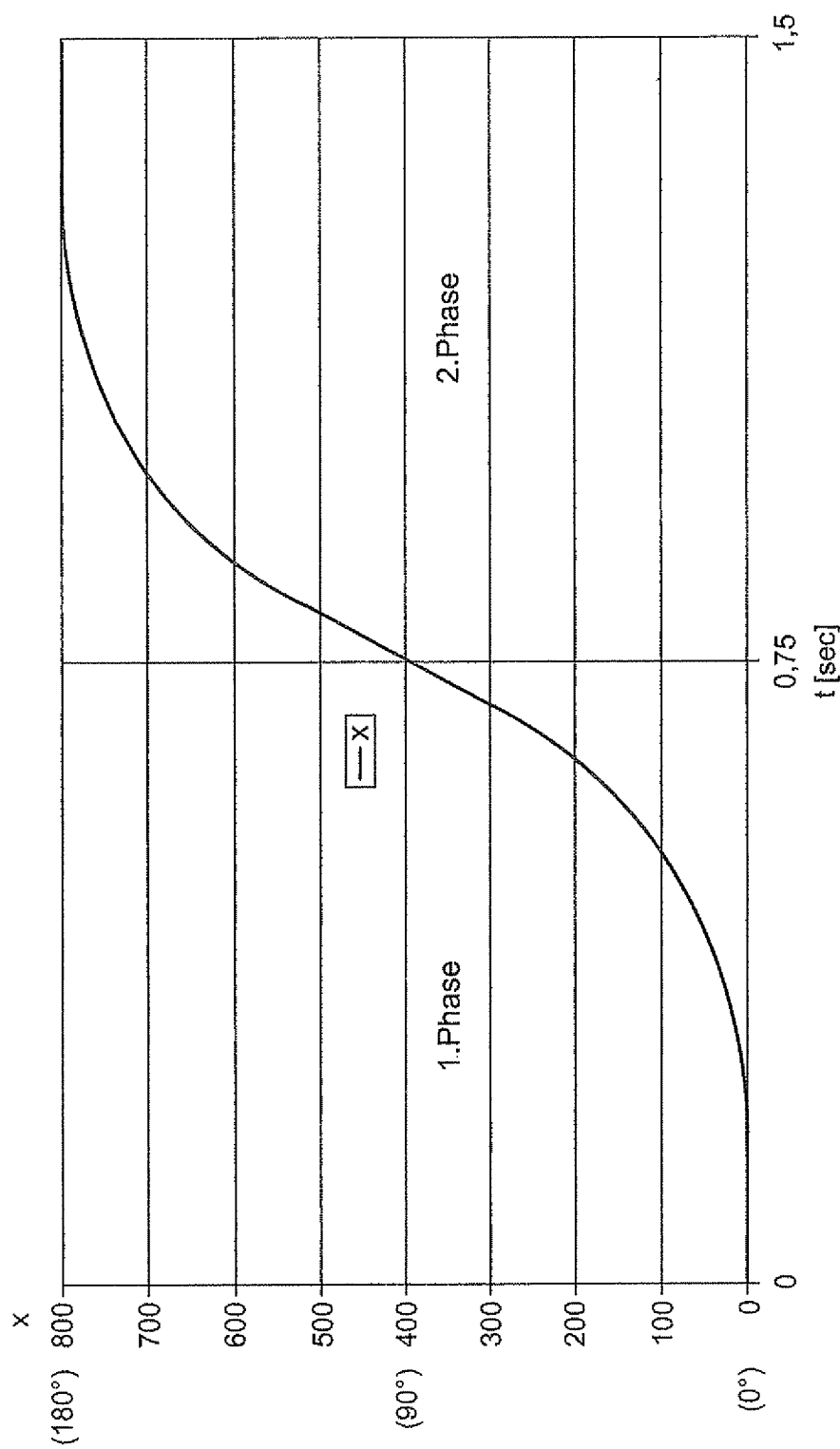
FIG. 4 shows the time characteristic of a pixel of the graphical object during a rotation of the readout of the display shown in FIG. 2 to the readout of the display shown in FIG. 3.

FIG. 4 shows the time characteristic of a pixel during the rotation by 180°. The pixel of the left edge of graphical object 6 travels from position 0 via the neutral position at position 400 up to the right edge of graphical object 6 at pixel 800. As apparent from FIG. 4, the pixel is accelerated in the first phase and decelerated in the second phase. In this case, the duration of the rotation was 0.75 second for each phase, so that the rotation by 180° was executed in 1.5 seconds.

According to a further refinement of the exemplary embodiment, the data from the speedometer of the motor vehicle are transferred into user-interface device 2, and therefore arithmetic logic unit 3, via vehicle bus 7. These data are used by arithmetic logic unit 3 to ascertain the duration of the rotation for the two phases. In this context, the higher the speed of the motor vehicle, the longer the duration of the total rotation.

LIST OF REFERENCE NUMERALS

1 Display
2 User-interface device
3 Arithmetic logic unit
4 Input device
5 Axis of rotation
6 Object
7 Vehicle bus
8 System clock
9 Command buttons

The invention claimed is:

1. A method for displaying information in a motor vehicle, comprising:
   graphically representing at least one two-dimensional graphical object by a display mounted in the motor vehicle, the graphical object including a display field and an operating field;
   generating, by a user-interface device, graphics data adapted to control the display to show the display field on one side of the two-dimensional graphical object and to show the operating field on the other side of the two-dimensional graphical object; and
   in response to an input by an input device, altering, by an arithmetic logic unit of the user-interface device, the graphics data to rotate the graphical object in a perspective representation on the display from one side to the other side.

2. The method according to claim 1, further comprising:
   generating, by the arithmetic logic unit, graphics data for successive intermediate images to represent the rotation; and
   subdividing the rotation into a first phase during which pixels of the graphical object are moved in accelerated fashion and a second phase during which pixels of the graphical object are moved in decelerated fashion.

3. The method according to claim 2, wherein the first phase corresponds to an angle of rotation of the graphical object from 0° to 90°, and the second phase corresponds to an angle of rotation of the graphical object from 90° to 180°.

4. The method according to claim 1, wherein an axis of rotation lies within the graphical object.

5. The method according to claim 2, wherein the calculating of the graphics data for successive intermediate images to represent the rotation in the first phase includes:
   (i) calculating $$n = \frac{t - t_0}{d_1};$$

(ii) calculating $x = b_1 + c_1 \cdot n^4$; and
   (ii) repeating (i) and (ii) until $t > (t_0 + d_1)$;
   wherein x represents successive positions of the pixels of the object, t represents a system time at which the generated graphics data are shown on the display, with $t = t_0$ at a beginning of the rotation of the first phase, $d_1$ represents a duration of the first phase, $b_1$ represents a starting position of the pixel of the graphical object, and $c_1$ represents a total shift of the pixel of the graphical object.

6. The method according to claim 2, wherein the calculating of the graphics data for successive intermediate images to represent the rotation in the second phase includes:
   (i) calculating $$n = \frac{t - t_0}{d_1} - 1;$$

(ii) calculating $x = b_2 + c_2 \cdot (1 - n^4)$,
   (iii) repeating (i) and (ii) unit until: $t > (t_0 + d_2)$;
   wherein x represents successive positions of the pixels of the object, t represents a system time at which the generated graphics data are shown on the display, with $t = t_0$ at a beginning of the rotation of the second phase, $d_2$ represents a duration of the second phase, $b_2$ represents a starting position of the pixel of the graphical object, and $c_2$ represents a total shift of the pixel of the graphical object in the second phase.

7. The method according to claim 2, wherein a duration of the rotation of the first phase is between 0.25 second and 1 second.

8. The method according to claim 2, wherein a duration of the rotation of the first phase is between 0.5 second and 0.75 second.

9. The method according to claim 2, wherein a duration of the rotation of the second phase is between 0.25 second and 1 second.

10. The method according to claim 2, wherein a duration of the rotation of the second phase is between 0.5 second and 0.75 second.

11. The method according to claim 2, further comprising:
   measuring a speed of the motor vehicle; and
   ascertaining at least one of (a) a duration of a total rotation, (b) a duration of the rotation of the first phase, and (c) a duration of the rotation of the second phase as a function of the speed of the motor vehicle.

12. The method according to claim 1, wherein the operating field includes command buttons adapted for input by the input device.

13. The method according to claim 1, wherein the input includes touching the display.

14. The method according to claim 1, wherein the input includes a gesture of a body part of a user performed in front of the display, the method further comprising detecting and evaluating the gesture by the input device.

15. The method according to claim 14, wherein the detecting of the gesture includes detecting a capacitive coupling between the body part and a receiving device.

16. The method according to claim 14, wherein the detecting of the gesture includes detecting an emission of infrared radiation and reflection of the infrared radiation by the body part of the user.

17. The method according to claim 1, wherein information from a driver-assistance system is displayed in the display field of the graphical object.

18. A display device for a motor vehicle, comprising:
   a display mounted in the motor vehicle and adapted to graphically represent information;
   a user-interface device adapted to generate at least one two-dimensional graphical object displayable on the display, the graphical object including a display field and an operating field; and
   an input device coupled to the user-interface device;
   wherein the user-interface device is adapted to generate graphics data to control the display to show the display field on one side of the two-dimensional graphical object and to show the operating field on the other side of the two-dimensional graphical object; and
   wherein the user-interface device includes an arithmetic logic unit adapted to alter, as a function of an input by input device, the graphics data to rotate the two-dimensional graphical object in a perspective representation on the display from one side to the other side.

19. The display device according to claim 18, wherein the arithmetic unit is adapted to generate graphics data for successive intermediate images to represent the rotation, the rotation subdivided into a first phase during which pixels of the graphical object are moved in accelerated fashion, and a second phase during which pixels of the graphical object are moved in decelerated fashion.

20. The display device according to claim 19, wherein the arithmetic logic unit is adapted to calculate the graphics data for successive intermediate images to represent the rotation in the first phase by:
   (i) calculation of $$n = \frac{t - t_0}{d_1};$$

(ii) calculation of $x = b_1 + c_1 \cdot n^4$; and
   (iii) repeating (i) and (ii) until: $t > (t_0 + d_1)$;
   wherein x represents successive positions of the pixels of the object, t represents a system time at which the generated graphics data are shown on the display, with $t = t_0$ at a beginning of the rotation of the first phase, $d_1$ represents a duration of the first phase, $b_1$ represents a starting position of the pixel of the graphical object, and $c_1$ represents a total shift of the pixel of the graphical object in the first phase.

21. The display device according to claim 19, wherein the arithmetic logic unit is adapted to calculate the graphics data for successive intermediate images to represent the rotation in the second phase:
   (i) calculation of $$n = \frac{t - t_0}{d_1} - 1;$$

(ii) calculation of $x = b_2 + c_2 \cdot (1 - n^4)$; and (iii) repeating (i) and (ii) until: $t > (t_0 + d_2)$;

wherein x represents successive positions of the pixels of the object, t represents a system time at which the generated graphics data are shown on the display, with $t = t_0$ at a beginning of the rotation of the second phase, $d_2$ represents a duration of the second phase, $b_2$ represents a starting position of the pixel of the graphical object, and $c_2$ represents a total shift of the pixel of the graphical object in the second phase.

22. The display device according to claim 18, wherein the display device includes an interface adapted to receive data concerning a speed of the motor vehicle, and the arithmetic logic unit is adapted to ascertain at least one of (a) a duration of total rotation and (b) a duration of the rotation as a function of the speed data.

23. The display device according to claim 18, wherein the input device includes a touch-sensitive surface of the display.

24. The display device according to claim 18, wherein the input device includes a device adapted to sense and evaluate a gesture of a body part of a user performed in front of the display.

25. The display device according to claim 24, wherein the input device includes a receiver device to which a signal is transmittable capacitively from the body part of the user when the body part is near the receiver device.

26. The display device according to claim 24, wherein the input device includes an infrared-light source and a receiver adapted to detect infrared light to detect the gesture of the body part of the user.

27. The display device according to claim 18, wherein the user-interface device is coupled to at least one driver-assistance system, and the user-interface device is adapted to generate the graphics data to display information from the driver-assistance system in the display field of the graphical object.

28. A motor vehicle, comprising a display device according to claim 18.

* * * * *

UNITED STATES PATENT AND TRADEMARK OFFICE
CERTIFICATE OF CORRECTION

PATENT NO.       : 8,677,271 B2                                           Page 1 of 1
APPLICATION NO.  : 12/674398
DATED            : March 18, 2014
INVENTOR(S)      : Dehmann et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1003 days.

Signed and Sealed this
Twenty-ninth Day of September, 2015

Michelle K. Lee
*Director of the United States Patent and Trademark Office*